United States Patent
Øverbye

(10) Patent No.: US 10,043,096 B2
(45) Date of Patent: Aug. 7, 2018

(54) RIM-WISE FUNCTION ESTIMATION

(71) Applicant: String Limited, Surrey (GB)

(72) Inventor: Johan Øverbye, Oslo (NO)

(73) Assignee: STRING LIMITED, Surrey (GB)

(*) Notice: Subject to any disclaimer, the term of this patent is extended or adjusted under 35 U.S.C. 154(b) by 0 days.

(21) Appl. No.: 15/310,170

(22) PCT Filed: May 13, 2015

(86) PCT No.: PCT/GB2015/051407
§ 371 (c)(1),
(2) Date: Nov. 10, 2016

(87) PCT Pub. No.: WO2015/173567
PCT Pub. Date: Nov. 19, 2015

(65) Prior Publication Data
US 2017/0262730 A1    Sep. 14, 2017

(30) Foreign Application Priority Data

May 13, 2014  (GB) .................................. 1408494.1

(51) Int. Cl.
*G06K 9/46* (2006.01)
*G06K 9/62* (2006.01)

(52) U.S. Cl.
CPC ......... *G06K 9/4638* (2013.01); *G06K 9/4647* (2013.01); *G06K 9/623* (2013.01)

(58) Field of Classification Search
CPC ..... G06K 9/4638; G06K 9/623; G06K 9/4647
See application file for complete search history.

(56) References Cited

U.S. PATENT DOCUMENTS

| | | | |
|---|---|---|---|
| 6,148,114 A | 11/2000 | Han | |
| 2003/0012441 A1 | 1/2003 | Trifonov et al. | |
| 2005/0025378 A1 | 2/2005 | Maurer | |
| 2010/0188552 A1 | 7/2010 | Feng et al. | |
| 2012/0081553 A1 | 4/2012 | Cote et al. | |
| 2012/0183224 A1* | 7/2012 | Kirsch ................ | G06K 9/4619 382/195 |

OTHER PUBLICATIONS

Anonymous: "Laplace Filter", Nov. 4, 2013 (Nov. 4, 2013).
(Continued)

*Primary Examiner* — Ruiping Li
(74) *Attorney, Agent, or Firm* — Mintz Levin Cohn Ferris Glovsky and Popeo, P.C.

(57) ABSTRACT

A method for analyzing an image composed of pixels by estimating a continuous function of a selected pixel attribute, the continuous function being centered on a selected pixel position, the method comprising: determining a series of nested sets of pixels, each set being centered on a common pixel; estimating a discrete weighting for each set of pixels in accordance with the continuous function; mapping the sets of pixels onto pixels of the image with the common pixel mapped on to the selected pixel position; for each set of pixels, forming a combined value in dependence on the values of the selected pixel attribute for the pixels of the set in the image; and estimating the function as a sum of the combined values for each set weighted by the respective discrete weighting.

16 Claims, 3 Drawing Sheets

(56) References Cited

OTHER PUBLICATIONS

Anonymous: "Laplacian of Gaussian (LoG)", Apr. 29, 2012 (Apr. 29, 2012).
Anonymous: "The Laplace Operator", Sep. 4, 2006 (Sep. 4, 2006).
Rosenfeld A: "Picture Processing by Computer", ACM Computing Surveys, ACM, New York, NY, US, US, vol. 1, No. 3, Sep. 1, 1969 (Sep. 1, 1969), pp. 147-176.
Ryu J et al: "Fast image blurring using Lookup Table for real time feature extraction", Industirial Electronics, 2009, ISIE 2009, IEEE International Symposium on, IEEE, Piscataway, NY, USA, Jul. 5, 2009 (Jul. 5, 2009), pp. 1864-1869.
International search report issued in PCT/GB2015/051407 dated Oct. 7, 2015.
Search report issued in GB1408494.1 dated Oct. 7, 2015.

\* cited by examiner

|   |   |   |   |   |   |   |   |   |   |
|---|---|---|---|---|---|---|---|---|---|
|   |   |   |   | K | J | K |   |   |   |
|   |   |   | I | H | G | H | I |   |   |
|   |   | I | F | E | D | E | F | I |   |
|   | K | H | E | C | B | C | E | H | K |
|   | J | G | D | B | A | B | D | G | J |
|   | K | H | E | C | B | C | E | H | K |
|   |   | I | F | E | D | E | F | I |   |
|   |   |   | I | H | G | H | I |   |   |
|   |   |   |   | K | J | K |   |   |   |
|   |   |   |   |   |   |   |   |   |   |

*FIG. 1*

| 4 | 3 | 3 | 2 | 2 | 4 | 4 | 3 | 2 | 4 | 1 |
|---|---|---|---|---|---|---|---|---|---|---|
| 1 | 2 | 3 | 5 | 3 | 3 | 4 | 5 | 3 | 0 | 5 |
| 4 | 3 | 0 | 1 | 1 | 2 | 4 | 2 | 2 | 1 | 5 |
| 0 | 3 | 5 | 2 | 1 | 5 | 1 | 5 | 1 | 3 | 0 |
| 0 | 4 | 0 | 2 | 5 | 4 | 4 | 5 | 1 | 0 | 3 |
| 3 | 0 | 0 | 3 | 0 | 3 | 4 | 5 | 4 | 2 | 2 |
| 5 | 4 | 3 | 3 | 4 | 1 | 1 | 1 | 2 | 1 | 4 |
| 4 | 3 | 5 | 4 | 0 | 4 | 1 | 3 | 0 | 1 | 4 |
| 1 | 0 | 0 | 4 | 1 | 1 | 2 | 1 | 4 | 3 | 1 |
| 1 | 2 | 3 | 2 | 1 | 1 | 5 | 2 | 3 | 5 | 0 |
| 3 | 2 | 1 | 5 | 3 | 2 | 5 | 3 | 1 | 3 | 1 |

RIM-WISE FUNCTION ESTIMATION

CROSS-REFERENCES TO RELATED APPLICATIONS

This application is a national stage entry, filed under 35 U.S.C. § 371, of International Application No. PCT/GB2015/051407, filed on May 13, 2015, and claims the benefit of and priority to Great Britain Patent Application No. 1408494.1, filed on May 13, 2014, the entire contents of which are hereby incorporated herein by reference in their entireties and for all purposes.

This invention relates to numeric techniques for estimating the value of functions.

Many analytical techniques can be modelled theoretically using continuous functions. When those techniques are subsequently applied in practice on discrete data it can become useful to approximate the value of a continuous function as represented by discrete data points. This approximation can involve a considerable amount of processing. It is desirable to reduce the processing load, especially on battery-powered devices and on devices with modest processing capacity.

One example of a situation in which a function may need to be evaluated based on a set of discrete data points is image processing. A processing device may receive an image. It may then be desired to process that image, for example by enhancing the appearance of the image, detecting boundaries in the image or transforming the orientation or shape of the image. Images are typically defined by a set of pixels, each pixel having one or more values that characterise the appearance of the image at a single point. For example, the pixel may have a chrominance value and a luminance value, or a set of values each representing the intensity of a respective colour such as red, green or blue. The pixels are normally arranged on an orthogonal grid.

In order to assess the nature of the image in the region around a specific pixel position it may be desired to evaluate a function that takes as its input the values of a group of pixels centred on the specific pixel position. In some instances that will be an isotropic radially symmetric function: i.e. one in which equivalent significance is given to pixels at equal distance from the central pixel position. One example of such a function is the Laplacian of Gaussian filter centred on the central pixel position. The Laplacian of Gaussian filter returns a value in respect of a central pixel position, which value is determined as a weighted sum of the attributes of the specific pixel and other pixels around it. With the specific pixel position of x=0, y=0, the Laplacian of Gaussian filter gives a weighting for a pixel at position x, y of:

$$-\frac{1}{\pi\sigma^4}\left(1-\frac{x^2+y^2}{2\sigma^2}\right)e^{-\frac{x^2+y^2}{2\sigma^2}}$$

Where σ represents the Gaussian standard deviation, influencing the weighting of the function. Typically, beyond a certain distance, the significance given to pixels will diminish with distance from the central pixel position, and as a result pixels that are beyond some distance from the central pixel position can be ignored.

FIG. 1 shows a field of pixels arranged on an orthogonal grid. If it is desired to assess the nature of the image in the region of pixel 1 an isotropic function centred on pixel 1 may be used. That function involves applying weightings that vary with distance from central pixel 1. In FIG. 1 groups of pixels whose positions are of equal distance from pixel position 1 are designated by letters A to K. Each letter designates a set of pixels of equal distance from pixel 1. An equal weighting will be applied to all the pixels designated by that letter. Each pixel has an attribute value such as luminance or hue, to which the weightings will be applied. For example, FIG. 2 shows the values of the selected attribute for the same pixels as are shown in FIG. 1. To evaluate the function centred on pixel 1 it is necessary to compute the appropriate weighted sum, which is:

$$A\times 3+B\times(0+4+4+1)+\ldots+K\times(3+4+0+1+5+1+4+4)$$

In practice it may be necessary to evaluate the same function for many pixel positions in an image, for example if the image is being scanned to locate features such as boundaries. The image may contain many thousands of pixels, and may be part of a video stream having tens of frames per second. This represents a considerable processing load, especially for a small device such as a cellular phone.

There is a need to reduce the processing load to evaluate such a function.

According to one aspect of the present invention there is provided a method for analysing an image composed of pixels by estimating a continuous function of a selected pixel attribute, the continuous function being centred on a selected pixel position, the method comprising: determining a series of nested sets of pixels, each set being centred on a common pixel; estimating a discrete weighting for each set of pixels in accordance with the continuous function; mapping the sets of pixels onto pixels of the image with the common pixel mapped on to the selected pixel position; for each set of pixels, forming a combined value in dependence on the values of the selected pixel attribute for the pixels of the set in the image; and estimating the function as a sum of the combined values for each set weighted by the respective discrete weighting.

According to another aspect of the present invention there is provided a device for analysing an image composed of pixels by the method of estimating a continuous function of a selected pixel attribute, the continuous function being centred on a selected pixel position, the device being configured to perform the steps of: determining a series of nested sets of pixels, each set being centred on a common pixel; estimating a discrete weighting for each set of pixels in accordance with the continuous function; mapping the sets of pixels onto pixels of the image with the common pixel mapped on to the selected pixel position; for each set of pixels, forming a combined value in dependence on the values of the selected pixel attribute for the pixels of the set in the image; and estimating the function as a sum of the combined values for each set weighted by the respective discrete weighting.

Each nested set of pixels apart from the central one may be substantially annular in shape.

The method may comprise the step of acquiring the image. The step of estimating a discrete weighting may be performed prior to the step of acquiring the image. The method may comprises storing the discrete weightings in a non-transient form.

The method may comprise estimating multiple groups of discrete weightings, each group of discrete weightings representing a different relationship of weighting with distance from the common pixel, the method comprises selecting a group of the weightings and the step of estimating the function comprises estimating the function as a sum of the combined values for each set weighted by the respective discrete weighting from the selected group.

The discrete weighting for each set of pixels may be equal to the value of the continuous function at a mid-point of the respective set.

The continuous function may be an isotropic function about the common pixel.

The step of forming a combined value for a given set may comprise summing the values of the selected pixel attribute for the pixels of the set in the image.

The method may comprise estimating the continuous function of the selected pixel attribute centred on a second pixel position adjacent to the selected pixel position by the steps of: mapping the sets of pixels onto pixels of the image with the common pixel mapped on to the second pixel position; for each set of pixels, forming a new combined value in dependence on the values of the selected pixel attribute for the pixels of the set in the image by (i) deducting from the combined value for the corresponding set as centred on the selected pixel position the values of the selected pixel attribute for those pixels included in the corresponding set as centred on the selected pixel position but included not in the set as centred on the second pixel position and (ii) adding to the combined value for the corresponding set as centred on the selected pixel position the values of the selected pixel attribute for those pixels not included in the corresponding set as centred on the selected pixel position but included in the set as centred on the second pixel position; and estimating the function as a sum of the new combined values for each set weighted by the respective discrete weighting.

The continuous function may be the Gaussian.

The continuous function may be the Laplacian of Gaussian.

The attribute may be luminance.

At least some of the sets may include pixels at multiple distances from the common pixel.

The present invention will now be described by way of example with reference to the accompanying drawings, in which:

FIG. 1 illustrates weightings for pixels in an array.

FIG. 2 illustrates attribute values for pixels in the array of FIG. 1.

FIG. 3 illustrates rims in an array of pixels.

FIG. 4 illustrates attribute values for pixels in the array of FIG. 3.

Figure 5:
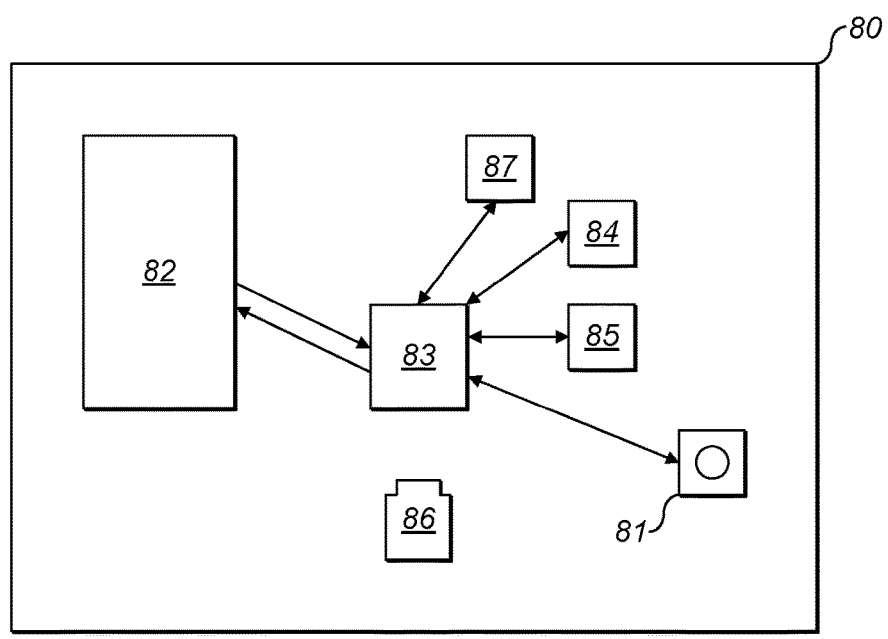
FIG. 5 illustrates apparatus for processing an image.

In the examples described below the value of a function is approximated by applying an equal weighting to pixels of roughly similar but not identical distance from a central pixel position. This approach greatly simplifies the evaluation of the function.

For illustration it will be supposed that an image is to be analysed using the Laplacian of Gaussian function. The Laplacian of Gaussian function for a given central pixel position involves forming a weighted sum of the values of an attribute of each pixel in a set of pixels surrounding the central pixel position. With the central pixel at position x=0, y=0, the Laplacian of Gaussian filter gives a weighting for a pixel at x, y of:

$$-\frac{1}{\pi\sigma^4}\left(1-\frac{x^2+y^2}{2\sigma^2}\right)e^{-\frac{x^2+y^2}{2\sigma^2}}$$

where σ represents the Gaussian standard deviation. The attribute that is considered could, for example, be luminance. Other functions could be used, for example the Gaussian function or other functions incorporating or based on the Gaussian function.

Figures 3, 4:
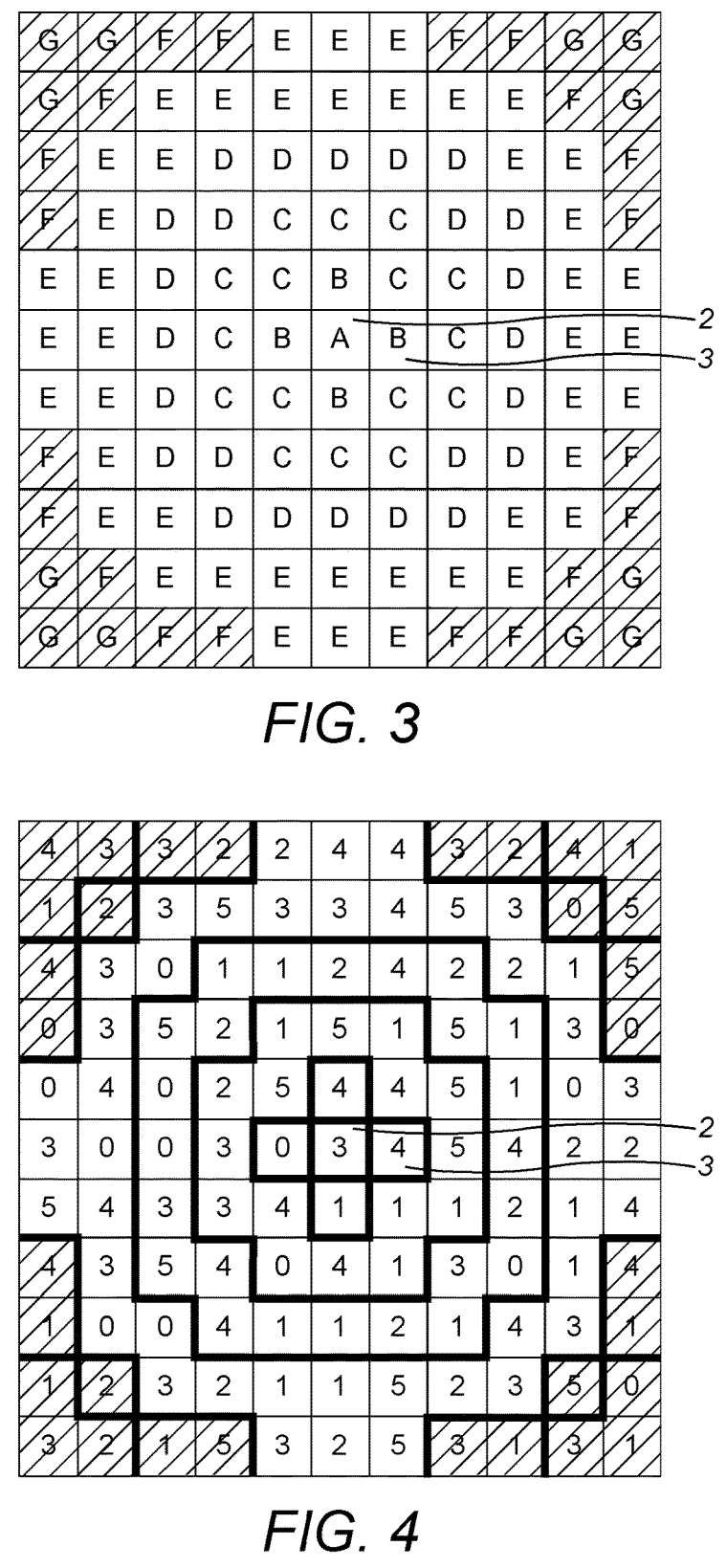

FIG. 3 shows an array of pixels including a central pixel 2. The pixels are grouped into sets, with the pixels of each set designated by a common letter. Each set forms a ring, rim or annulus centred on the central pixel position. The sets can be formed by choosing a series of radial limits and considering all pixels that fall within one limit but not within any of the others to constitute a set. In this example, taking each pixel to be of dimensions 1 unit by 1 unit, the first few limits could be as follows:

1. limit=0.9, defining set A
2. limit=1.4, defining set B as being at radii above 0.9 and up to 1.4
3. limit=2.8, defining set C as being at radii above 1.4 and up to 2.8
4. limit=3.9, defining set D as being at radii above 2.8 and up to 3.9
5. limit=5.2, defining set E as being at radii above 3.9 and up to 5.2

Alternatively the sets may be formed as approximate annuluses in any convenient fashion.

The width of any set may be less than or equal to or greater than one pixel. The width of any set may be less than or equal to or greater than two pixels.

A common weight will be applied for all the pixels in each set. The weight for a set may be calculated as the weight for a point mid-way between the radial limits of that set. For example, a point mid-way between the radial limits of set C is the point x=0, y=(1.4+2.8)/2=2.1, so the weight for set C could be the weight computed by, in this case, the Laplacian of Gaussian for point x=0, y=2.1. Alternatively the weight may be calculated as the weight for a point whose radius from the central pixel position corresponds to the radius of a circle that divides the set in question into two equal areas. For example, the radius of a circle that would divide set C into equal areas is:

$$\sqrt{1.4^2 + \frac{2.8^2 - 1.4^2}{2}} = 2.21$$

so the weight for set C could be the weight computed by, in this case, the Laplacian of Gaussian for point x=0, y=2.21. Other approaches could be used to choose the weight for each set. When multiple pixels need to be considered, whether in the same image or in multiple images, the weights for the sets could be pre-computed and stored and the stored values could be used each time a pixel is to be analysed.

To estimate the value of the function for a given set of pixels the values of the selected attribute for all the pixels in that set can be summed and then multiplied in a single step by the weight for that set. The respective products for all the sets that are to be used can be summed to give an estimate of the function centred on the central pixel position.

The number of sets that are to be used can vary depending on the function that is being estimated and the application. In one convenient embodiment, a total of 8 sets are used, the largest extending to a radius of ten pixels from the central pixel position.

The system described above has a number of efficient characteristics for image analysis. First, it may be desired to consider an image at a number of different scales. This can, for instance, be useful if the image is being analysed to assess sharpness. With the system described above, there is no need to fully recompute the function to analyse the image at different scales. Instead, for analysis at different scales different weights could be applied to the same sets of pixels. The weights for each scale could be pre-computed and stored. When a pixel is to be analysed the values of the selected attribute for the pixels of each set could be summed and stored for each set. Then, to analyse the image at one scale each of those sums could be multiplied by the respective weight for that scale and summed, and to analyse the image at another scale each of those sums could be multiplied by the respective weight for that other scale and summed. With this approach the values for a set need only be summed once at each pixel position.

A second advantage arises when it is desired to evaluate the function for two pixel positions that are adjacent to each other. In evaluating the function for the first of those pixel positions, the values of the selected attribute for the pixels in each set surrounding that pixel are summed. Those sums can be stored, as described above. Then to evaluate the function for the adjacent pixel, rather than sum all the pixels in each set again, the sum for each set can be modified by (i) subtracting the values for the pixels that were in the set centred on the original pixel but are not in the set for the adjacent pixel and by (ii) adding the values for the pixels that were not in the set centred on the original pixel but are in the set for the adjacent pixel. With this approach, for a given set, only the pixels that are included given one pixel position but not included given an adjacent position, or vice versa, need be involved in the generation of the set sum for the adjacent pixel position. From the geometry of the sets as shown in FIG. 3 it will be seen that for the radially outer sets there are many pixels in common between the set around one pixel position and the corresponding set around a pixel position adjacent to that one pixel position in a vertical or horizontal direction. For example, set E contains 44 pixels and 26 of them are common to the rim around pixel 2 and the corresponding rim around the horizontally adjacent pixel 3.

For illustration, suppose that the values of the pixels shown in FIG. 3 are as shown in FIG. 4. The thicker lines in FIG. 4 mark the boundaries between sets of pixels. Suppose that the function to be evaluated is $(x^2+y^2)^{-0.4/S} \times L$, where x and y represent the x and y coordinates of a sampled pixel relative to a central pixel position for which the function is being evaluated, S is the scale under consideration and L is the luminance of the sampled pixel. Suppose that only the first five sets (A to E) are being considered.

The weights are pre-computed for a range of scales, as follows:

|     | Scale |       |       |
| --- | ----- | ----- | ----- |
| Set | 1     | 2     | 3     |
| A   | 1.436 | 2.061 | 2.958 |
| B   | 0.878 | 0.771 | 0.676 |
| C   | 0.530 | 0.280 | 0.149 |
| D   | 0.376 | 0.141 | 0.053 |
| E   | 0.295 | 0.087 | 0.026 |

Then the pre-determined sets of pixels are mapped on to the image to be processed, and sums of the values for each of the sets of pixels are computed, as follows:

| Set | Sum |
| --- | --- |
| A   | 3   |
| B   | 9   |
| C   | 45  |
| D   | 44  |
| E   | 66  |

Now the function can easily be estimated at any of the scales by summing the products of the weights for a selected scale with the respective value sums.

|                            | Scale  |        |        |
| -------------------------- | ------ | ------ | ------ |
| Set                        | 1      | 2      | 3      |
| A                          | 4.307  | 6.182  | 8.875  |
| B                          | 7.901  | 6.936  | 6.088  |
| C                          | 23.831 | 12.620 | 6.683  |
| D                          | 16.550 | 6.225  | 2.341  |
| E                          | 19.482 | 5.751  | 1.697  |
| Total = function evaluation | 72.069 | 37.713 | 25.685 |

If the function is now to be evaluated for pixel 3, which is adjacent to pixel 2, then the set sums can be efficiently recomputed in the manner described above. For example, set D can be adjusted by subtracting (1+5+0+0+3+5+4)+(5+1+4+2+3)=33, representing the attribute values for the pixels in the former set but not in the new set, and adding (2+3+0+2+1+1+4)+(1+2+3+3+0)=22, representing the pixels in the new set but not in the former set, to give a new sum of 33 for set D. Thus in order to compute a new sum for set D not all the pixels in the new set D need to be evaluated. This saves processing time.

When a new group of sets is computed centred on a pixel position adjacent to the one on which the previous group of sets was centred a further saving in processing time can be had. In most cases the attribute sums that are subtracted from or added to one set can be added to or subtracted from another set, meaning that many of the individual attribute values need be considered only once as the sets move by one step. In the example given above, set D was adjusted by subtracting (1+5+0+0+3+5+4)+(5+1+4+2+3). The sum (1+5+0+0+3+5+4) represents a group of values that were in set D in the previous iteration and will now be in set E. The sum (1+5+0+0+3+5+4) can therefore be computed once only in this iteration and the result subtracted from set D and added to set E. Similarly, the sum (5+1+4+2+3) represents a group of values that were in set D in the previous iteration and will now be in set C. The sum (5+1+4+2+3) can therefore be computed once only in this iteration and the result subtracted from set D and added to set C. The sum (2+3+0+2+1+1+4) represents a group of values that were in set E in the previous iteration and will now be in set D. The sum (2+3+0+2+1+1+4) can therefore be computed once only in this iteration and the result added to set D and subtracted from set E. The sum (1+2+3+3+0) represents a group of values that were in set C in the previous iteration and will now be in set D. The sum (1+2+3+3+0) can therefore be computed once only in this iteration and the result added to set D and subtracted from set C. In general, where an adjoining group of pixel positions were in a first set in the previous iteration and in a second set in the next iteration then in that next iteration the values for those pixel positions may be summed only once and that sum subtracted from the previous first set value and added to the previous second set value as part of computing set values for that next iteration.

One reason for evaluating a function centred on a particular pixel is to assess whether a visual boundary in the image is present between a set of pixel positions. It has been found that adopting the Laplacian of Gaussian as the function, preferably also with the luminance of the pixel as the attribute, is a particularly effective way to assess the presence of a boundary. However, other functions could be used. The present method will provide an especially effective approximation of the function when the function is an isotropic radially symmetric function, but the method can be used with other functions. The Laplacian of Gaussian is a convenient filter for use in the present system because it tends to emphasise boundaries. Other filters with similar properties, including but not limited to difference-of-Gaussians, determinant of Hessian, Sobel, Canny and Canny-Deriche could be used either alone or in combination with other functions in the present method. Attributes other than the luminance could be used to provide the values that are evaluated by means of the function. The value of the attribute of a pixel could be determined by other known functions for providing an indication of the presence of a boundary at or near the position of the pixel.

FIG. 5 illustrates apparatus for implementing the method described above. The apparatus comprises a housing 80 in which are a camera 81, a display 82, a processor 83, a non-volatile memory or ROM 84 and a working memory or RAM 85. The apparatus is powered by a battery 86. In this example the display 82 is a touchscreen, so it provides user input to the processor 83 as well as being driven by the processor, but a separate keypad could be provided. The ROM 84 stores program code that is executable by the processor. The program code is stored in a non-transient form. The program code is executable by the processor to perform the functions described above. In operation the processor can acquire an image, either from the camera 81 or from a remote communications transceiver 87. In the former case, the image could be an image captured by the camera of the environment at the location of the device. In the latter case, the image could be downloaded from the internet. The processor stores the image in RAM 85. The image could be displayed on the display 82. Once the image is stored in RAM, the processor can analyse it using an algorithm as described above. Then, dependent on the outcome of the analysis the process may perform further operations in dependence on the stored program code. For example, it could alter the image to highlight detected boundaries. Alternatively it could re-colour regions inside one or more detected boundaries, for example in response to selection of those regions by a user by means of the touchscreen. Alternatively, a user could select one of those regions, and the processor could identify other regions that are surrounded by detected boundaries and have attributes in common with the selected region (for example a hue that differs by less than a predetermined threshold from the average hue of the selected region) and then recolour both the selected and the identified regions similarly. Alternatively, the processor could use the position of the detected boundaries to infer information about the three-dimensional spatial relationship of objects represented in the image.

In the example above, the device can capture image data and process it locally. Alternatively, it could capture image data, transmit it to a remote server for analysis and then receive back from the server information related to the detected boundaries.

The device of FIG. 5 could be a mobile phone.

The image could be a still image or a frame or portion of a frame of a video stream.

Each pixel is a sub-unit of the image. The pixels could be monochrome or colour pixels. For display or image capture a colour image is often divided into channels of individual colours which when considered collectively represent a certain luminance and chrominance at a certain location. For the purpose of performing the algorithm described above a single pixel of the image may be considered to be formed by those channels in combination. Preferably for the purpose of performing the algorithm described above each pixel fully characterises the visual content of the image at the location of the pixel.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A computer-implemented method for analysing an image composed of pixels by estimating a continuous function of a selected pixel attribute, the continuous function being centred on a selected pixel position, the image being analysed for processing of the image, the method comprising:
   determining a series of nested sets of pixels, each set being centred on a common pixel;
   estimating a discrete weighting for each set of pixels in accordance with the continuous function;
   mapping the sets of pixels onto pixels of the image with the common pixel mapped on to the selected pixel position;
   for each set of pixels, forming a combined value in dependence on the values of the selected pixel attribute for the pixels of the set in the image;
   estimating multiple groups of discrete weightings, each group of discrete weightings representing a different relationship of weighting with distance from the common pixel;
   selecting a group of the weightings from the multiple groups of discrete weightings; and
   estimating the function as a sum of the combined values for each set weighted by the respective discrete weighting from the selected group.

2. A method as claimed in claim 1, wherein each nested set of pixels apart from the central one is substantially annular in shape.

3. A method as claimed in claim 1, wherein the method comprises the step of acquiring the image, the step of estimating a discrete weighting is performed prior to the step of acquiring the image, and the method comprises storing the discrete weightings in a non-transient form.

4. A method as claimed in claim 1, wherein the discrete weighting for each set of pixels is equal to the value of the continuous function at a mid-point of the respective set.

5. A method as claimed in claim 1, wherein the continuous function is an isotropic function about the common pixel.

6. A method as claimed in claim 1, wherein the step of forming a combined value for a given set comprises summing the values of the selected pixel attribute for the pixels of the set in the image.

7. A method as claimed in claim 1, further comprising estimating the continuous function of the selected pixel attribute centred on a second pixel position adjacent to the selected pixel position by the steps of:
   mapping the sets of pixels onto pixels of the image with the common pixel mapped on to the second pixel position;
   for each set of pixels, forming a new combined value in dependence on the values of the selected pixel attribute for the pixels of the set in the image by (i) deducting from the combined value for the corresponding set as centred on the selected pixel position the values of the selected pixel attribute for those pixels included in the corresponding set as centred on the selected pixel position but not included in the set as centred on the second pixel position and (ii) adding to the combined value for the corresponding set as centred on the selected pixel position the values of the selected pixel attribute for those pixels not included in the corresponding set as centred on the selected pixel position but included in the set as centred on the second pixel position; and
   estimating the function as a sum of the new combined values for each set weighted by the respective discrete weighting.

8. A method as claimed in claim 1, wherein the continuous function is the Gaussian.

9. A method as claimed in claim 1, wherein the continuous function is the Laplacian of Gaussian.

10. A method as claimed in claim 1, wherein the attribute is luminance.

11. A method as claimed in claim 1, wherein at least some of the sets include pixels at multiple distances from the common pixel.

12. A device for analysing an image composed of pixels by estimating a continuous function of a selected pixel attribute, the continuous function being centred on a selected pixel position, the image being analysed for processing of the image, the device being configured to perform the steps of:
   determining a series of nested sets of pixels, each set being centred on a common pixel;
   estimating a discrete weighting for each set of pixels in accordance with the continuous function;
   mapping the sets of pixels onto pixels of the image with the common pixel mapped on to the selected pixel position;
   for each set of pixels, forming a combined value in dependence on the values of the selected pixel attribute for the pixels of the set in the image;
   estimating multiple groups of discrete weightings, each group of discrete weightings representing a different relationship of weighting with distance from the common pixel;
   selecting a group of the weightings from the multiple groups of discrete weightings; and
   estimating the function as a sum of the combined values for each set weighted by the respective discrete weighting from the selected group.

13. A non-transitory computer readable storage medium having stored thereon computer readable instructions that, when executed at a computer system, cause the computer system to perform a method for analysing an image composed of pixels by estimating a continuous function of a selected pixel attribute, the continuous function being centred on a selected pixel position, the image being analysed for processing of the image, the method comprising:
   determining a series of nested sets of pixels, each set being centred on a common pixel;
   estimating a discrete weighting for each set of pixels in accordance with the continuous function;
   mapping the sets of pixels onto pixels of the image with the common pixel mapped on to the selected pixel position;
   for each set of pixels, forming a combined value in dependence on the values of the selected pixel attribute for the pixels of the set in the image; and
   estimating multiple groups of discrete weightings, each group of discrete weightings representing a different relationship of weighting with distance from the common pixel;
   selecting a group of the weightings from the multiple groups of discrete weightings; and
   estimating the function as a sum of the combined values for each set weighted by the respective discrete weighting from the selected group.

14. A method as claimed in claim 1, wherein the method comprises outputting the estimated function for processing of the image.

15. A device as claimed in claim 12, further comprising an output configured to output the estimated function for processing of the image.

16. A non-transitory computer readable storage medium of claim 13, wherein the method comprises outputting the estimated function for processing of the image.

* * * * *